US008060801B2

United States Patent
Seol et al.

(10) Patent No.: US 8,060,801 B2
(45) Date of Patent: Nov. 15, 2011

(54) METHOD AND APPARATUS FOR DYNAMICALLY ALLOCATING HARQ BUFFER IN WIRELESS COMMUNICATION SYSTEM

(75) Inventors: Ji-Yun Seol, Seongnam-si (KR);
Hyun-Sang Cho, Yongin-si (KR);
Bong-Gee Song, Seongnam-si (KR);
Jong-Han Lim, Seongnam-si (KR);
Jin-Woo Roh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1097 days.

(21) Appl. No.: 11/900,754

(22) Filed: Sep. 13, 2007

(65) Prior Publication Data

US 2008/0065944 A1    Mar. 13, 2008

(30) Foreign Application Priority Data

Sep. 13, 2006 (KR) .................. 10-2006-0088763

(51) Int. Cl.
*G06F 11/00* (2006.01)
(52) U.S. Cl. ..................................... 714/748
(58) Field of Classification Search .......... 714/748, 714/749
See application file for complete search history.

(56) References Cited

U.S. PATENT DOCUMENTS

| | | | | |
|---|---|---|---|---|
| 6,700,867 | B2 * | 3/2004 | Classon et al. | 370/216 |
| 7,286,540 | B2 * | 10/2007 | Kim et al. | 370/394 |
| 7,496,335 | B2 * | 2/2009 | Nibe | 455/115.1 |
| 7,539,497 | B2 * | 5/2009 | Beale | 455/451 |
| 7,797,605 | B2 * | 9/2010 | Garrett et al. | 714/748 |
| 7,813,361 | B2 * | 10/2010 | Lee et al. | 370/412 |
| 2006/0092960 | A1 | 5/2006 | Lee et al. | |

FOREIGN PATENT DOCUMENTS

| | | |
|---|---|---|
| JP | 1-232852 | 9/1989 |
| KR | 1020060039843 | 5/2006 |
| KR | 1020060052441 | 5/2006 |

* cited by examiner

*Primary Examiner* — James C Kerveros
(74) *Attorney, Agent, or Firm* — The Farrell Law Firm, P.C.

(57) ABSTRACT

Disclosed is a method and apparatus for efficiently controlling buffers which support a Hybrid Automatic Repeat Request (HARQ) in a wireless communication system. Buffer regions for the HARQ scheme are not fixedly allocated according to channel identification information, but are allocated from the viewpoint of one overall memory through aggregation support. That is, an HARQ buffer is dynamically controlled. Therefore, there are the effects reducing the size of the entire chip, as well as reducing power consumption of the entire system according to the reduction of the chip size.

13 Claims, 9 Drawing Sheets

| ACID | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Alloc_ACID | 1 | 0 | 0 | 0 | 1 | 0 | 0 | 0 | 0 | 1 | 1 | 0 | 0 | 1 | 0 | 0 |
| New_Tx | 0 | x | x | x | 0 | x | x | x | x | 1 | 0 | x | x | 1 | x | x |

FIG.2

| ACID | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ACK | 0 | 0 | 1 | 0 | 1 | 1 | 1 | 0 | 0 | 0 | 0 | 1 | 1 | 1 | 0 | 1 |

FIG.3

| ACID | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ACID_Clr | 0 | 0 | 1 | 0 | 1 | 1 | 1 | 0 | 0 | 1 | 0 | 1 | 1 | 1 | 0 | 1 |
| Nblock | 60 | 50 | 70 | 30 | 0 | 80 | 20 | 50 | 40 | 50 | 30 | 0 | 0 | 0 | 20 | 0 |

FIG.4

| MemoryBlock# | 0 | 1 | 2 | ... | | | Max_Nblock-1 |
|---|---|---|---|---|---|---|---|
| ACID#0 | 0 | 1 | 0 | ... | 0 | 1 | 1 |
| ACID#1 | 0 | 0 | 0 | ... | 0 | 0 | 0 |
| ACID#2 | 1 | 0 | 0 | ... | 0 | 0 | 0 |
| ... | | | | ... | | | |
| ACID#14 | 0 | 0 | 1 | ... | 0 | 0 | 0 |
| ACID#15 | 0 | 0 | 0 | ... | 0 | 0 | 0 |

MEMORY BLOCK BITMAP

FIG.5

METHOD AND APPARATUS FOR DYNAMICALLY ALLOCATING HARQ BUFFER IN WIRELESS COMMUNICATION SYSTEM

PRIORITY

This application claims priority to application entitled "Method And Apparatus For Dynamically Allocating HARQ Buffer In Wireless Communication System" filed with the Korean Intellectual Property Office on Sep. 13, 2006 and assigned Serial No. 2006-88763, the contents of which are incorporated herein by reference.

BACKGROUND OF THE INVENTION

1. Field of the Invention

The present invention relates to a wireless communication network, and more particularly to a method and apparatus for efficiently controlling buffers which support a Hybrid Automatic Repeat Request (HARQ).

2. Description of the Related Art

Recently, mobile communication services have been tested for the possibility of creating a new market while providing various services, such as broadcasting, multimedia images, e-mail, multimedia messages, etc. In such an information-oriented age, the demand for various wireless multimedia services of different qualities, for example, from a low speed to a high speed, in either real time or in non-real time, etc., has been increasing.

For this reason, studies are being conducted to develop new technology for efficiently allocating users with frequency channels, i.e., limited frequency bands, which are a main resource in a mobile communication system. In line with this, radio transmission element technologies, such as wireless multiple access and multiplexing, high-speed packet radio transmission, and a radio link control, have been proposed in the wireless communication system.

Especially, in the radio link control technology, a Hybrid Automatic Repeat Request (HARQ) scheme is technology for controlling errors, in which an Automatic Repeat request (ARQ) scheme and a Forward Error Correction (FEC) scheme are combined. The HARQ scheme can be applied to packet data services for bursty packet data, such as wireless Internet packet, that is, to services requiring a high reliability of transmission data.

A receiving terminal employing the HARQ scheme transmits either an affirmative signal, i.e. an ACKnowledgement (ACK) or a negative signal, i.e. a Negative AcKnowledgement (NAK) to a transmitting terminal as a response signal according to whether or not received data has been successfully decoded, thereby requesting the transmitting terminal to retransmit the same data if necessary. That is, the HARQ scheme has such a mechanism that the transmitting terminal retransmits corresponding data when receiving a NAK signal as a result of decoding from the receiving terminal. The receiving terminal obtains a gain in the reception performance by combining the retransmitted data and previous data. The receiving terminal stores the received data in order to determine whether a burst (i.e. a set of data) received from the transmitting terminal corresponds to newly-transmitted data or retransmitted data, and to obtain a performance gain through combination of the data.

In order to normally perform the operation of the HARQ scheme, it is necessary to control the received HARQ burst, and to efficiently control and manage a memory which stores the received HARQ burst.

According to the Institute of Electrical and Electronic Engineers (IEEE) 802.16 standard and Mobile WiMAX standard, which are developing a wireless standard in relation to the HARQ scheme, the allocation of an HARQ burst by a transmitting terminal and the transmission of an ACK/NAK ReSPonse (ACK_RSP) to the HARQ burst by a receiving terminal are performed based on HARQ channels (i.e. HARQ Channel Identification (ACID), which is identification information for identifying HARQ channels). Also, whether a downlink HARQ burst corresponding to a newly-transmitted burst or a retransmitted burst is determined based on whether an HARQ Indicator Sequence Number (AI_SN) field information of an HARQ DownLink MAP (DL_MAP) message has been toggled to "0" or "1."

That is, when the AI_SN field information upon allocating an HARQ burst to a corresponding ACID and AI_SN field information for current HARQ burst allocation are equal to each other, a retransmission has occurred, and when they are different, a new transmission has occurred.

Therefore, in order to combine allocated HARQ bursts according to ACIDs in the wireless communication system, a correct determination of new transmission and retransmission must first be performed. However, in the actual communication environments, there is a problem in that when retransmission is determined with only information about whether 1-bit AI_SN field information in the DL-MAP is toggled or not, the accuracy of the determination is low.

1) The following parameters, which are values used in the IEEE 802.16e standard, are items representing the performance of a terminal, and are values subjected to Subscriber station Basic Capacity (SBC) negotiation upon cooperation with a base station.

number of DL HARQ channels
  DL HARQ buffer capability per channel
  aggregation flag for DL
  maximum number of DL HARQ bursts per frame In contrast, the following parameters are items defined by the base station and informed from the base station, and are values having no connection to the performance of the terminal.

ACK delay value for DL HARQ burst
  maximum number of retransmission in DL HARQ

In line with this, the Mobile WiMAX classifies and defines categories of parameters connected with the performance of a terminal. Generally, as a higher-level category is employed, a mean throughput supportable in a terminal increases, but a memory region required in the terminal also increases.

Therefore, when it is assumed that 4 bits are employed for a Log-Likelihood Ratio (LLR), the sizes of the buffers required for each category may be calculated as follows.

DL Category 1 (Aggregation ON/OFF)

16,384 bits×4 (LLR bits)×4 channels=262,144 bits

DL Category 2 (Aggregation ON)

8,192 bits×4 (LLR bits)×16 channels=524,288 bits

DL Category 3 (Aggregation ON)

16,384 bits×4 (LLR bits)×16 channels=1,048,576 bits

DL Category 4 (Aggregation ON)

23,170 bits×4 (LLR bits)×16 channels=1,482,880 bits

As described above, generally, as the level of a category increases, the size of a memory required for supporting the HARQ also increases. Especially, for categories 2 to 4, aggregation for an HARQ buffer is required as an essential item (Aggregation ON).

Particularly, when aggregation for an HARQ buffer is supported as described above, the conventional method allocates an allocatable maximum memory region according to each ACID in order to reduce the complexity caused by managing memory regions allocated according to ACIDs.

According to such a conventional method, since the management of only a start address and an end address according to each ACID is required, the complexity in implementation is reduced. However, according to such a memory management method, since a very large memory region is allocated to each ACID, the total of actually-required memory regions increases in geometric progression according to the number of used channels. That is, since an HARQ buffer is allocated using a start address and an end address according to each ACID, each ACID occupies a memory region of a predetermined size, so that it is possible to allocate and use each ACID within a corresponding memory region. However, an actual memory size calculated according to each category of the Mobile WiMAX requires a memory region twice as large as the number of HARQ channels. That is, a memory region of 1.0 Mbits is required for Category 1, 8.4 Mbits for Category 2, 16.8 Mbits for Category 3, and 23.7 Mbits for Category 4.

Therefore, it is necessary to develop a more efficient memory management method than the conventional method of allocating a fixed memory region according to each ACID. In addition, it is necessary to develop a new memory allocation method by taking into consideration the fact that a fixed memory region according to each used ACID increases in geometric progression when aggregation is supported.

SUMMARY OF THE INVENTION

Accordingly, the present invention has been made to solve at least the above-mentioned problems occurring in the prior art, and the present invention provides a method and apparatus for efficiently managing a memory which supports a Hybrid Automatic Repeat Request (HARQ) in a wireless communication system.

Also, the present invention provides a method and apparatus for managing an HARQ buffer by dynamically allocating a memory region, instead of allocating a fixed memory region according to each HARQ channel, in the wireless communication system.

Also, the present invention provides a method and apparatus for allocating HARQ data to an HARQ buffer in consideration of a new transmission and a retransmission in the wireless communication system.

In addition, the present invention provides a method and apparatus for performing an allocation operation in such a manner as to have a dynamic memory region in managing the HARQ buffer according to each channel.

In accordance with an aspect of the present invention, there is provided a method for dynamically allocating a Hybrid Automatic Repeat Request (HARQ) buffer, which stores received HARQ bursts, to HARQ channels in a wireless communication system, the method includes determining, according to each HARQ channel, if an HARQ burst has been allocated to a current frame, if the HARQ burst corresponds to a retransmitted burst, and ACK/NAK according to success/failure of decoding of an allocated HARQ burst, thereby determining whether an HARQ buffer region is allocated or released; and allocating the released buffer region to be used for a burst of another HARQ channel.

In accordance with another aspect of the present invention, there is provided an apparatus for dynamically allocating a Hybrid Automatic Repeat Request (HARQ) buffer, which stores received HARQ bursts, to HARQ channels in a wireless communication system, the apparatus includes a retransmission checker for managing, according to each HARQ channel, information regarding if an HARQ burst has been allocated to a current frame, information if the HARQ burst corresponds to a retransmitted burst, and ACK/NAK information according to success/failure of decoding of an allocated HARQ burst; a buffer controller for managing information representing allocation/release of the identification information according to the allocation information and retransmission/non-retransmission for each HARQ channel, and information about a size of an HARQ buffer region allocated corresponding to the HARQ burst according to each channel; and an HARQ buffer for releasing or maintaining the buffer regions according to a control of the buffer controller.

BRIEF DESCRIPTION OF THE DRAWINGS

The above and other aspects, features and advantages of the present invention will be more apparent from the following detailed description taken in conjunction with the accompanying drawings, in which:

FIG. 2 is a diagram of an HARQ retransmission checker 112 according to an exemplary embodiment of the present invention;

FIG. 3 is a diagram of an ACK information manager 114 according to an exemplary embodiment of the present invention;

FIG. 4 is a diagram of an HARQ buffer controller according to an exemplary embodiment of the present invention;

FIG. 5 is a diagram of a memory block bitmap managed by the HARQ buffer controller according to an exemplary embodiment of the present invention;

DETAILED DESCRIPTION OF THE EXEMPLARY EMBODIMENT

Hereinafter, an exemplary embodiment of the present invention will be described with reference to the accompanying drawings. In the following description, a detailed description of known functions and configurations incorporated herein will be omitted when it may obscure the subject matter of the present invention. Terms described in the following description are defined by taking functions thereof into consideration, so they may vary according to users, operator's intention, or custom. Accordingly, the terms must be defined based on the entire contents of the present application.

The present invention described below provides a method and apparatus for allocating memory regions to Hybrid Automatic Repeat Request (HARQ) channels with the concept of one overall memory through aggregation support, instead of fixedly allocating buffer regions for HARQ according to each ACID.

Also, the present invention provides a method and apparatus for dynamically allocating memory regions according to each ACID for HARQ.

In addition, the present invention provides an efficient memory allocation method and apparatus, which can make a normal HARQ burst allocation, even if an abnormal HARQ burst allocation has been caused by a transmission error of an HARQ ACK signal.

Accordingly, the present invention minimizes the size of a memory required for aggregation support of an HARQ buffer, and minimizes the power consumption of the entire system by using the minimized HARQ buffer.

Figure 1:
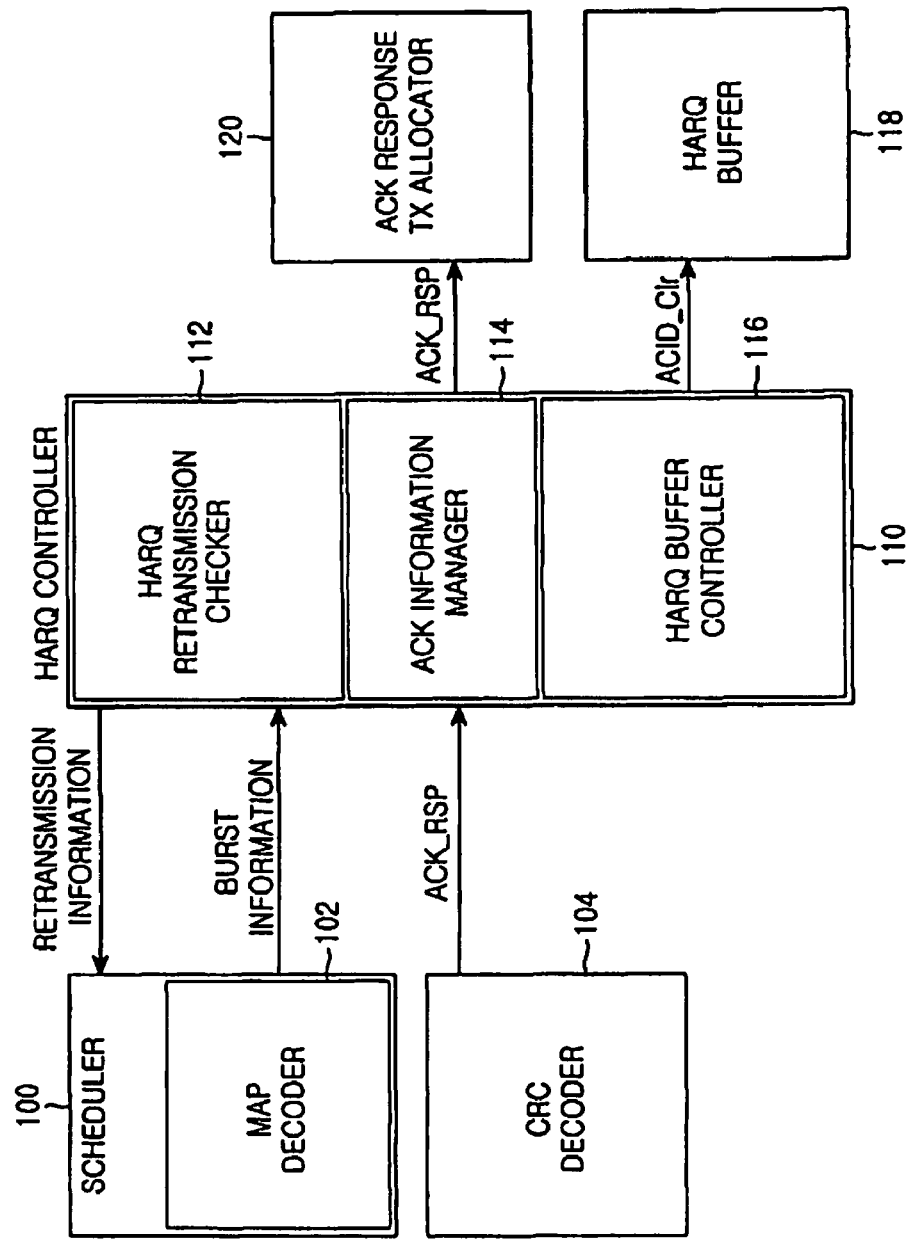
FIG. 1 is a block diagram of an HARQ controller in a wireless communication system according to an exemplary embodiment of the present invention.

FIG. 1 is a block diagram of an HARQ controller according to an exemplary embodiment of the present invention.

An HARQ controller 110 includes an HARQ retransmission checker 112, an ACK information manager 114, and an HARQ buffer controller 116. The HARQ retransmission checker 112 checks if an HARQ burst allocated to the current frame corresponds to a retransmission. The ACK information manager 114 receives ACK/NAK determination values resulting from a cyclic redundancy check (CRC) from a CRC decoder 104, which performs the CRC for the HARQ burst, and manages the received ACK/NAK determination values. The HARQ buffer controller 116 performs a dynamic control for an HARQ buffer allocated according to each HARQ channel.

According to the IEEE 802.16e standard, an HARQ is configured to a maximum of 16 HARQ channels (ACID). That is, a base station allocates an HARQ burst according to each HARQ channel, and either retransmits a previously-allocated burst or transmits a new burst based on a response signal ACK RSP for each HARQ channel, which has been received from a terminal. The HARQ controller 110 determines if a burst allocated according to each HARQ channel corresponds to a retransmission based on an ACK/NAK result, and manages the HARQ buffer.

First, the HARQ retransmission checker 112 checks whether a DL HARQ burst corresponds to a new transmission or a retransmission by means of information about an HARQ burst allocated to a specific HARQ channel, which is generated as a result of decoding an HARQ DL-MAP message output from a MAP decoder 102, and of a previous ACK/NAK result for the specific HARQ channel.

The HARQ retransmission checker 112 stores information about previously allocated HARQ bursts according to each HARQ channel. In this case, the information about the HARQ bursts varies depending on supported HARQ modes.

For example, in the case of HARQ Chase-Combining in an IEEE 802.16e system, the HARQ retransmission checker 112 manages and stores information as below according to each HARQ channel in order to determine if an HARQ burst allocated to a terminal corresponds to a retransmission.

ACID: Identification information for identifying an HARQ channel allocated with an HARQ burst, and an ACK channel. In the following description, the HARQ channel and the ACK channel will be inclusively designated as "ACID."

AI_SN: information which represents whether or not an HARQ burst allocated a corresponding ACID through bit toggling (0/1) corresponds to a retransmission.

DIUC: information which represents an error correction type (FEC code type) of an allocated HARQ burst.

Duration: information which represents the number of slots of an allocated HARQ burst.

Repetition: information about repetition of an allocated HARQ burst. The "Repetition" can be changed upon retransmission.

The HARQ retransmission checker 112 manages whether a HARQ burst is allocated according to each ACID in the current frame or not, and manages a result of determination for retransmission of an ACID allocated with an HARQ burst, as ON (1)/OFF (0) flags, by means of the aforementioned information.

FIG. 2 is a diagram of managing retransmission/non-retransmission according to each ACID under the control of the HARQ retransmission checker 112 according to the present invention.

When an Allocated ACID (Alloc_ACID) has a value of ON (1), it means that an HARQ burst has been allocated to a corresponding ACID of the current frame. In contrast, when an Alloc_ACID has a value of OFF (0), it means that an HARQ burst has not been allocated to a corresponding ACID of the current frame. In addition, when a New Transmission (New_Tx) has a value of ON (1), it means a new transmission. In contrast, when a New_Tx has a value of OFF (0), it means a retransmission. Also, when a New_Tx has a value of "X" indicative of "Don't care," it means that an HARQ burst has not been allocated to a corresponding ACID. Therefore, when an Alloc_ACID has a value of OFF (0), a corresponding New_Tx has a value of "X" representing "Don't care," and when an Alloc_ACID has a value of ON (1), a corresponding New_Tx has a value of ON (1) or OFF (0) according to whether a corresponding HARQ burst corresponds to a new transmission or a retransmission.

The ACK information manager 114 manages a result of the ACK/NAK determination for an HARQ burst allocated according to each ACID.

FIG. 3 is a diagram in which the ACK information manager 114 manages ACK/NAK flags according to each ACID.

When the flag of an ACID has a value of ON (1), it represents an ACK, and when the flag of an ACID has a value of OFF (0), it represents an NAK. In this case, the current frame initially expresses the results of the ACK/NAK determination for HARQ bursts finally allocated according to each ACID up to the previous frame. Thereafter, with respect to an ACID allocated to the current frame, a CRC decoding is performed, and then the ACK/NAK states of the current frame are updated.

The HARQ buffer controller 116 creates a flag for indicating "clear" or "reallocation" with respect to a memory region, which has been allocated as an HARQ buffer for HARQ combining according to each ACID. Also, the HARQ buffer controller 116 manages the sizes of memory regions to be newly allocated and memory regions occupied according to each ACID. This is shown in FIG. 4.

FIG. 4 is a diagram in which the HARQ buffer controller 116 manages an HARQ buffer according to the present invention.

When an ACID_Clr flag has a value of ON (1), it means that a memory region allocated to a corresponding ACID is released. That is, it means that a memory region previously-allocated corresponding to the corresponding ACID is shifted into a clear state so that the memory region can be allocated as a region for a new ACID. In contrast, when an ACID_Clr flag has a value of OFF (0), it means that a memory region allocated to a corresponding ACID is maintained in the allocated state. Also, the value of an Nblock according to each ACID represents the size of a memory region occupied by each ACID, or the size of a memory region to be reallocated after the memory region has been released.

In this case, the HARQ buffer controller 116 may manage the values of the Nblock in units of bits or bytes so as to express the actual size of each memory region. Also, for convenience, the values of the Nblock may be expressed as the number of unit memory blocks by dividing the entire memory in units of memory blocks, each of which has a predetermined size.

For example, with respect to the Mobile WiMAX Category 3, when the size of each memory block M is determined to be 4096 bits using a 4-bit LLR, a total of 272 memory blocks are required for the entire HARQ buffer.

Also, the HARQ buffer controller 116 gives numbers from zero to "Max_Nblock−1" with respect to a maximum "Max_Nblock" of memory blocks, and establishes and manages a memory block bitmap representing whether or not a specific memory block is allocated according to each ACID. This is shown in FIG. 5.

The HARQ buffer controller 116 establishes a block bitmap according to each ACID with respect to memory blocks for the HARQ buffer. When a value in the bitmap is "1" for a specific memory block "MemoryBlock #X," it means that the specific memory block has been allocated to an ACID.

As described above, the HARQ controller 110 manages information about burst allocation according to each ACID, the results of ACK/NAK determination, the re-establishment and sizes of HARQ burst memory regions, etc. In this case, the meanings of the ON(0) and OFF(1) established for flags according to each ACID may be changed.

With reference to FIGS. 1 to 5, whether or not an HARQ burst corresponds to a retransmitted burst is determined primarily by checking whether or not an AI_SN value has been toggled. However, in order to increase the accuracy of a retransmission determination of an HARQ burst allocated to a specific ACID, the aforementioned information about the HARQ burst may be additionally used.

That is, the HARQ retransmission checker 112 receives information about an HARQ burst allocated to a specific ACID in the current frame from the MAP decoder 102, and compares the received information with information about an HARQ burst previously allocated to the specific ACID, thereby determining whether the HARQ burst allocated in the current frame corresponds to a newly transmitted burst or a retransmitted burst. In this case, since an AI_SN is configured by one bit and may have any one value of 0 and 1 as an initial value, a terminal cannot determine if the AI_SN has been toggled at first.

Therefore, for example, an initial AI_SN value (pre_AI_SN) is initialized to "2b'10" or "2b'11" in the start, and then the AI_SN is augmented and used, such as "2b 00" or "2'b01" obtained by adding "0" to an upper bit of the initial AI_SN value.

Also, ACK information represents a result of ACK/NAK for an HARQ burst previously allocated to a corresponding ACID and received from the ACK information manager 114. Among the results of the retransmission determination, "duplication" represents that a HARQ burst corresponds to a retransmitted burst when it is determined according to HARQ burst allocation information about a corresponding ACID, but the HARQ burst has already resulted in ACK as a result of decoding.

Therefore, in the New_Tx flag according to each ACID managed by the HARQ retransmission checker 112, the case of the "duplication" is handled in the same way as a retransmission.

Consequently, when completing a determination as to whether an HARQ burst according to each ACID allocated in the current frame corresponds to a newly transmitted burst or a retransmitted burst, the HARQ retransmission checker 112 updates the Alloc_ACID representing if an HARQ burst has been allocated according to each ACID, and the New_Tx value representing if an HARQ burst corresponds to a newly transmitted burst, which are shown in FIG. 2.

Also, ACK/NAK information about all ACIDs up to the previous frame is transferred as determination information for memory management according to each ACID in the ACK information manager 114. Finally, when a CRC decoding for an HARQ burst allocated to the current frame has been performed, the ACK information manager 114 updates ACK/NAK information about a corresponding ACID, and transfers a corresponding value for transmission of an ACK_RSP to a transmitting terminal (Tx allocator) 120.

The HARQ buffer controller 116 receives information "Alloc_ACID [15:0]" indication if an HARQ burst has been allocated according to each ACID in the current frame, as well as results "New_Tx [15:0]" of the determination as to whether an HARQ burst allocated according to each ACID corresponds to a newly transmitted burst or a retransmitted burst, from the HARQ retransmission checker 112, and receives ACK/NAK information "ACK [15:0]" according to each ACID up to the previous frame from the ACK information manager 114.

Then, by using information about an HARQ burst allocated for a new transmission in the current frame, the size of a HARQ buffer memory (or the number "Nblock" of memory blocks) required for a corresponding ACID is calculated, and thereby, storage information is updated. For example, in the case of the IEEE 802.16e HARQ Chase Combining, when a memory for the HARQ buffer 118 is divided in units of predetermined sizes so as to be managed based on memory blocks, an Nblock value for an HARQ burst allocated for a new transmission in the current frame may be calculated as Equation (1) below.

$$N\text{block} = \text{ceil}(\text{Duration}/\text{Repetition} \times 48 \times \text{constellation-Size} \times 4\text{LLRbits}/M). \quad (1)$$

In Equation (1), the constellation size represents a bit size of a constellation according to a Modulation and Coding Scheme (MCS), and is given as shown in Table 1 below. Also, the LLR bits have a value representing a bit resolution of an LLR value. The following description will be given based on 4 LLR bits.

TABLE 1

| MCS Level | constellation size |
|---|---|
| QPSK ½ | 2 |
| QPSK ¾ | 2 |
| 16 QAM ½ | 4 |
| 16 QAM ¾ | 4 |
| 64 QAM ½ | 6 |
| 64 QAM ⅔ | 6 |
| 64 QAM ¾ | 6 |
| 64 QAM ⅚ | 6 |

In contrast, when the memory sizes of an HARQ buffer according to each ACID are managed in units of bits, instead of based on the number of memory blocks, Equation (2) below may be used.

$$Nblock = Duration/Repetition \times 48 \times constellationSize \times 4LLRbits \quad (2)$$

That is, with respect to even another HARQ mode, a memory size of an HARQ buffer required for each ACID may be calculated in a scheme similar to the aforementioned scheme.

The HARQ buffer controller 116 performs a re-establishment (or initialization) with respect to a memory region allocated according to each ACID by means of the information as described above.

As a result, an ACID Clear (ACID_Clr) [15:0], which is a flag representing if a memory has been re-established according to each ACID, is set. A setting condition for ACID_Clr flag information, a determination of the size of a memory (or the number of memory blocks) allocated according to each ACID, and a procedure of clearing an HARQ buffer memory are as follows.

(1) An ACID_Clr flag setting condition for re-establishing an HARQ buffer memory according to each ACID.

(a) A bit flag corresponding to an ACID which has an ACK as an ACK_RSP up to the previous frame is set to ON (1).

(b) When an HARQ burst has been allocated to the current frame, a bit of an ACID corresponding to a new transmission is set to ON (1).

(c) When the total sum of the size (Nblock) of memory allocated to ACIDs having an NAK as an ACK_RSP up to the previous frame and the size (Nblock) of memory required for ACIDs allocated for a new transmission in the current frame is larger than the total capacity (Max_Nblock) of the HARQ buffer, bit flags corresponding to all ACIDs unallocated in the current frame are set to On (1), which is defined as an abnormal case.

(d) With respect to ACIDs not corresponding to aforementioned cases (a) to (c), the corresponding bit of each ACID_Clr is set to OFF (0).

(2) Resetting conditions for memory sizes (Nblock) allocated according to each ACID (a) With respect to ACIDs unallocated for new transmission in the current frame (i.e. ACIDs either allocated for retransmission or unallocated in the current frame) among ACIDs corresponding to bits in which an ACID_Clr flag has been set in Condition (1), "Nblock [ACID]=0" is set.

(b) With respect to ACIDs allocated for new transmission in the current frame, values newly calculated with allocation information, such as Condition (1) or (2), are set.

(c) With respect to ACIDs of which an ACID_Clr flag bit has a value of an OFF (0), previously stored values are maintained.

(d) In an abnormal case, with respect to ACIDs unallocated in the current frame (i.e. Alloc_ACID=0), an Nblock value is set to "0."

Here, the case where the total sum of the sizes of memories allocated according to each ACID is greater than the entire HARQ buffer capacity, as described in item (c) in condition (1), is caused by a difference between the size of an HARQ buffer which is actually occupied in a terminal and the size of an HARQ buffer which a base station recognizes to be occupied on account of an ACK channel error, and will be referred to as an "abnormal case" by the HARQ buffer controller 116. In the abnormal case, the HARQ buffer controller 116 releases memory allocation for remaining ACIDs, except for ACIDs allocated in the current frame, as item (c) of condition (1), sets an abnormal flag to ON (1), and transfers the abnormal flag to the HARQ retransmission checker 112.

When receiving the abnormal flag (Abnormal_Flag) having a value of ON (1), the HARQ retransmission checker 112 initializes a previous ACK pre_AI_SN value for an ACID unallocated in the current frame based on reallocation (Alloc_ACID) to 2'b10 (or 2'b11), thereby setting the corresponding ACID to be unconditionally determined as a new transmission in the next allocation.

Based on an ACID_Clr set, as described above, the HARQ buffer controller 116 releases a previously-allocated memory region when the flag value of a corresponding bit has a value of ON (1) according to each ACID, and newly allocates a memory region as large as an Nblock with respect to an ACID to which a newly transmitted HARQ burst is allocated in the current frame.

Figure 6:
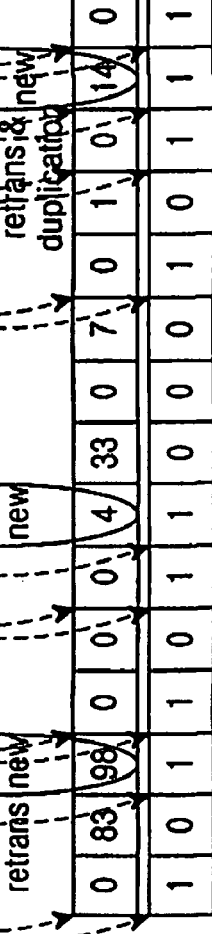
FIG. 6 is a diagram of an example in which the HARQ buffer controller manages a memory region in a normal case according to an exemplary embodiment of the present invention.
Figure 7:
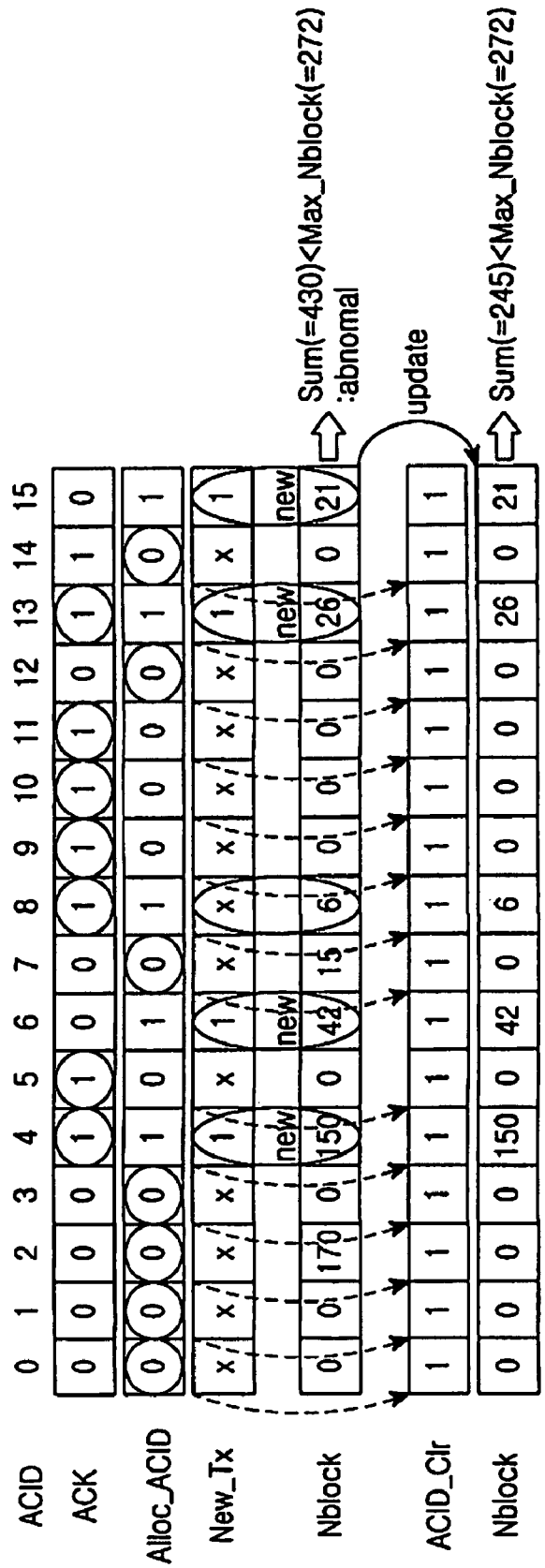
FIG. 7 is a diagram of an example in which the HARQ buffer controller manages a memory region in an abnormal case according to an exemplary embodiment of the present invention.

FIGS. 6 and 7 are diagrams illustrating examples in which the HARQ buffer controller manages the HARQ buffer in units of ACIDs according to the present invention, wherein examples of setting an ACID_Clr flag and an Nblock value are set with respect to a normal case and an abnormal case.

The examples will be described on the assumption that when the HARQ buffer is managed in units of memory blocks each of which includes M=4096 bits, the total number of blocks Max_Nblock" is "272.

Referring to FIG. 6, with respect to ACID #0, ACK information has a value of "1," which represents that a previously transmitted HARQ burst has been normally received by a receiving side. The reallocation Alloc_ACID of ACID #0 has been set to "0," and the New_Tx thereof has been set to X, which represents that there is no newly transmitted HARQ burst. Therefore, the Nblock of ACID #0 is set to "0," and a release state of an HARQ memory region for ACID #0 is set to "1," thereby being cleared.

With respect to ACID #1, ACK information has a value of "0," which represents that a previously transmitted HARQ burst has not been normally received by the receiving side. That is, a negative determination NAK has been made in response to the previously transmitted HARQ burst. Since a retransmitted burst is allocated to the current frame, the allocation Alloc_ACID of ACID #1 has been set to "1," and the New_Tx thereof has been set to "0." In this case, the clear flag of an HARQ memory region for ACID #1 has a value of "0," and the previous memory region maintains a previous Nblock value "83."

With respect to ACID #2, ACK information has a value of "1," which represents that a previously transmitted HARQ burst has been normally received by a receiving side. Since a newly transmitted HARQ burst exists in ACID #2 of the current frame, the allocation Alloc_ACID of ACID #2 has been set to "1," and the New_Tx thereof has been set to "1." The Nblock for the new HARQ burst is set to "98," and the HARQ memory region for ACID #2 is cleared to "1," so that the memory region can be changed to be used for the new HARQ burst.

Consequently, the HARQ buffer controller determines if the total sum of Nblock for the retransmitted and newly-transmitted HARQ bursts with respect to the total of 16 ACIDs has a value greater than the entire capacity of the HARQ buffer.

That is, the total sum of Nblock for ACID #1, to which 83 blocks are allocated for a retransmitted HARQ burst, ACIDs #7, #9, #11, and #15, to which 33, 7, 1, and 1 Nblock, respectively, are allocated for previously allocated HARQ bursts, and ACIDs #2, 6, and 13, to which 98, 4, and 14 blocks, respectively, are allocated for new HARQ bursts, is 241 blocks, thereby determining that the total sum of Nblock has a value less than "272," which is a set maximum Nblock value.

Therefore, it is determined that the HARQ buffer has been normally allocated for HARQ bursts according to the present invention.

In contrast, FIG. 7 is a diagram illustrating an example in which an abnormal case occurs when the HARQ buffer controller manages the HARQ buffer.

Referring to FIG. 7, with respect to ACID #0, ACK information is set to "0," which represents that a previously transmitted HARQ burst has not been normally received by a receiving side. That is, a negative determination NAK has been made with respect to the HARQ burst previously transmitted through ACID #0. Also, since an HARQ burst has not been allocated to ACID #0 of the current frame, the allocation Alloc_ACID of ACID #0 has been set to "0," and the "New_Tx" thereof has been set to X. In this case, the Nblock is maintained at "0," which is a previous value, as it is.

Meanwhile, with respect to ACID #2, ACK information is set to "0," which represents that a previously transmitted HARQ burst has not been normally received by the receiving side. That is, a negative determination NAK has been made with respect to the HARQ burst previously transmitted through ACID #2. Also, since an HARQ burst has not been allocated to ACID #2 of the current frame, the allocation Alloc_ACID of ACID #2 has been set to "0," and the New_Tx thereof has been set to X. In this case, the Nblock is maintained at "170," which is a previously set value.

Meanwhile, with respect to ACID #4, ACK information has a value of "1," which represents that a previously transmitted HARQ burst has been normally received by the receiving side. Also, since a new HARQ burst has been allocated to ACID #4 of the current frame, the reallocation Alloc_ACID thereof has been set to "1," and the New_Tx thereof has been set to "1." The Nblock for the new HARQ burst is set to "150," and the HARQ memory region for ACID #4 is cleared to "1," so that the HARQ memory region thereof can be changed to a memory region for the new HARQ burst requiring 150 Nblock.

With respect to ACID #6, ACK information is set to "0," which represents that a previously transmitted HARQ burst has not been normally received by the receiving side. However, since a new HARQ burst has been allocated to ACID #6 of the current frame, the reallocation Alloc_ACID thereof has been set to "1," and the New_Tx thereof has been set to "1." The Nblock for the newly transmitted HARQ burst is set to "42."

In this case, the HARQ buffer controller determines if the total sum of Nblock for the retransmitted and newly-transmitted HARQ bursts with respect to the total of 16 ACIDs has a value greater than the entire capacity of the HARQ buffer.

That is, the total sum of Nblock for ACIDs #2, #7, and #8, to which 170, 15, and blocks, respectively, are allocated for previously allocated HARQ bursts, and ACIDs #4, 6, 13, and 15, to which 150, 42, 26, and 21 blocks, respectively, are allocated for new HARQ bursts, is 430 blocks, thereby determining that the total sum of Nblock has a greater larger than "272," which is a set maximum Nblock value. Therefore, it can be understood that since the total sum of Nblock for all of the ACIDs has a value greater than the set maximum Nblock value, the HARQ buffer has not been normally allocated for HARQ bursts.

Therefore, when determining that the HARQ buffer has not been allocated for the retransmitted and newly-transmitted HARQ bursts, the HARQ buffer controller clears every HARQ buffer allocated to unallocated ACIDs based on whether or not each ACID of the current has been allocated. That is, when setting an ACID_Clr which is information representing whether or not the memory region according to each ACID is reset, the HARQ buffer controller sets the ACID_Clr flag value for an ACID, which has a value of "0", as an Alloc_ACID flag value representing an ACID allocated to the current frame, to "0," thereby clearing all of allocated memory regions.

Then, the Nblock for ACIDs associated with transmission of new HARQ bursts are updated. That is, the Nblock values for ACIDs unallocated to the current frame are updated to "0." Accordingly, the Nblock values for ACIDs #2 and #7 in FIG. 7 are updated and finally set to "0."

Thereafter, the total sum of Nblock for ACIDs #4, 6, 8, 13, and 15 to which 150, 42, 6, 26, and 21 blocks, respectively, are allocated for new HARQ bursts is 245 blocks, thereby determining that the total sum of Nblock has a value less than "272," which is a set maximum Nblock value. Therefore, it is determined that the HARQ buffer has been normally allocated for HARQ bursts.

As described above, the HARQ buffer controller releases a previously allocated memory region when a corresponding bit flag value for each ACID is "0," and newly allocates a memory region as many as Nblock to an ACID to which a newly transmitted HARQ burst has been allocated in the current frame.

Figure 8:
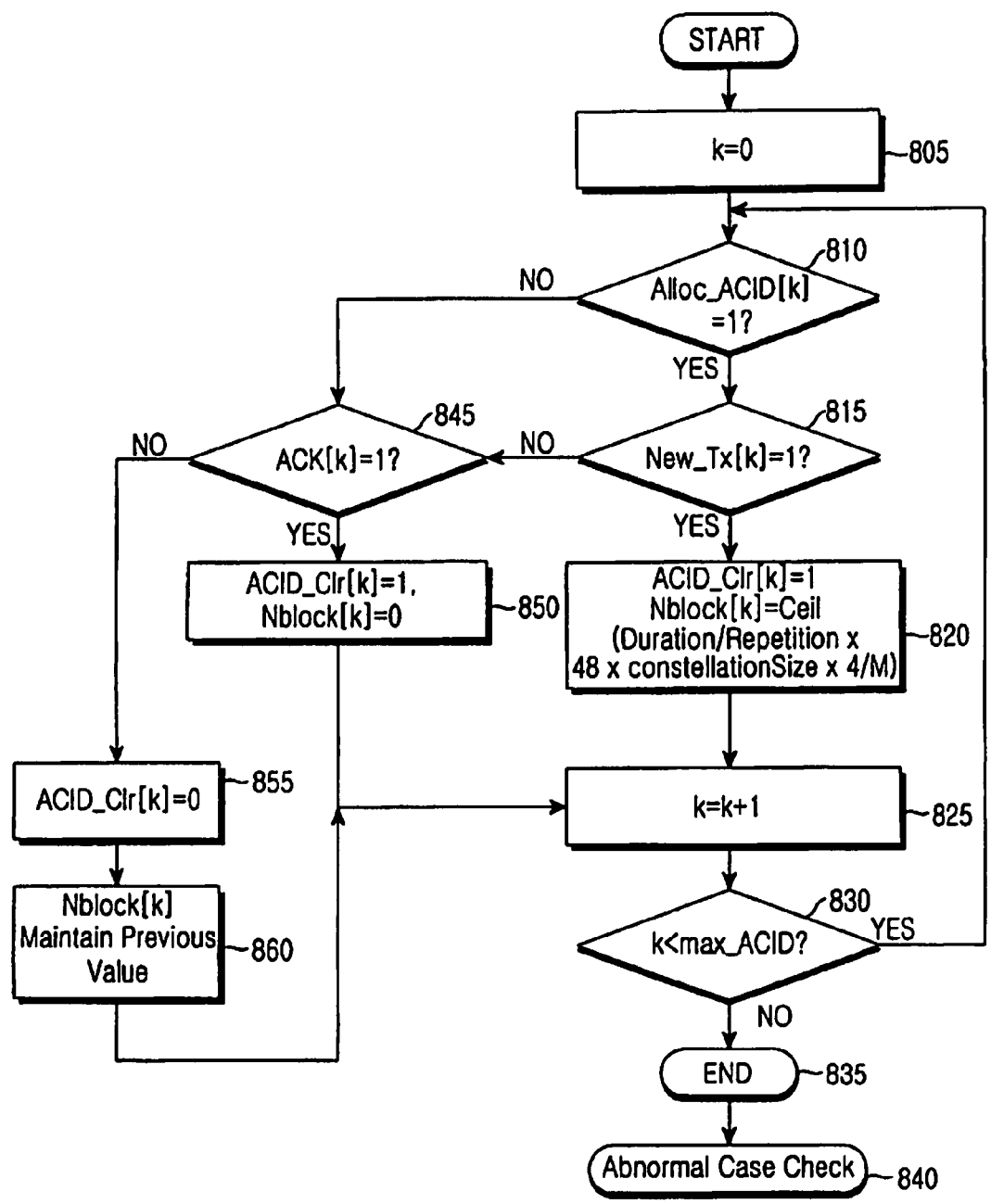
FIG. 8 is a flowchart illustrating a procedure of setting a memory region according to an exemplary embodiment of the present invention.

FIG. 8 is a flowchart illustrating a procedure of setting an ACID_Clr representing if memory allocation has been reset according to each ACID, and an Nblock value representing the size (i.e. the number of blocks) of allocated memory according to an exemplary embodiment of the present invention.

In step 805, an HARQ controller checks an ACID so as to identify a "k" value allocated to the ACID. The ACID represents identification information allocated for identifying HARQ channels, and a total of 16 pieces of identification information from "0" to "15" may be allocated for the ACID according to an exemplary embodiment of the present invention.

In step 810, the HARQ controller checks if reallocation (Alloc_ACID) has been performed with respect to a $k_{th}$ ACID. That is, it is determined if the reallocation (Alloc_ACID) for ACID #k has been set to "1." When the reallocation (Alloc_ACID) for ACID #k has been set to "1," the HARQ controller determines in step 815 if there is a newly-transmitted HARQ burst associated with the reallocated ACID #k. That is, it is determined if the New_Tx for ACID #k has been set to "1." When it is determined in step 815 that the New_Tx for ACID #k has been set to "1, the HARQ controller calculates in step 820 a memory region for ACID #k. The Nblock for ACID #k may be calculated by Equation (1) or (2).

In step 825, the HARQ controller increases ACID #k by one, and then checks ACID #k+1, which is the next ACID. That is, while increasing the value of "k" one by one, the HARQ controller checks if reallocation has been performed and if there is new transmission data through steps 810 to 820, and checks the Nblock corresponding to each ACID.

In step 830, the HARQ controller determines if ACID #k corresponds to the maximum channel number supported by the HARQ. When ACID #k corresponds to the maximum channel number, the HARQ controller checks if reallocation has been performed and if there is a newly-transmission data with respect to the last ACID channel, allocates an Nblock to the last ACID, and proceeds to step 835.

Thereafter, the HARQ controller proceeds to step 840, in which the HARQ controller checks if Nblock allocated for a total of 16 ACIDs have been allocated normally. A process of checking if Nblock allocated for the total of 16 ACIDs have been normally allocated will be described later with reference to FIG. 9.

In contrast, when it is determined in step 810 that the reallocation Alloc_ACID for ACID #k has been set to "0," so that ACID #k does not correspond to an allocated channel in the current frame, the HARQ controller proceeds to step 845, in which the HARQ controller checks if ACID #k has been determined to be an ACK, as a result of decoding with respect to a previously-transmitted HARQ burst.

When it is determined in step 845 that ACK information for ACID #k has been set to "1," the HARQ controller proceeds to step 850, in which the HARQ controller sets a clear flag of a memory region of an HARQ buffer for ACID #k to "1" (i.e. ACID_Clr=1), and sets the Nblock for ACID #k to "0." That is, according to the ACK information for a corresponding ACID, the HARQ controller clears an HARQ buffer's memory region allocated for ACID #k in a previous frame. Thereafter, the HARQ controller proceeds to step 825, so as to check ACID #k+1, which is the next ACID.

In contrast, when it is determined in step 845 that ACID #k has been determined to be a NAK, the HARQ controller sets the ACID_Clr flag bit to OFF (0) in step 855, and proceeds to step 860, in which the HARQ controller maintains the memory region (i.e. Nblock) for ACID #k at a previously stored value.

Figure 9:
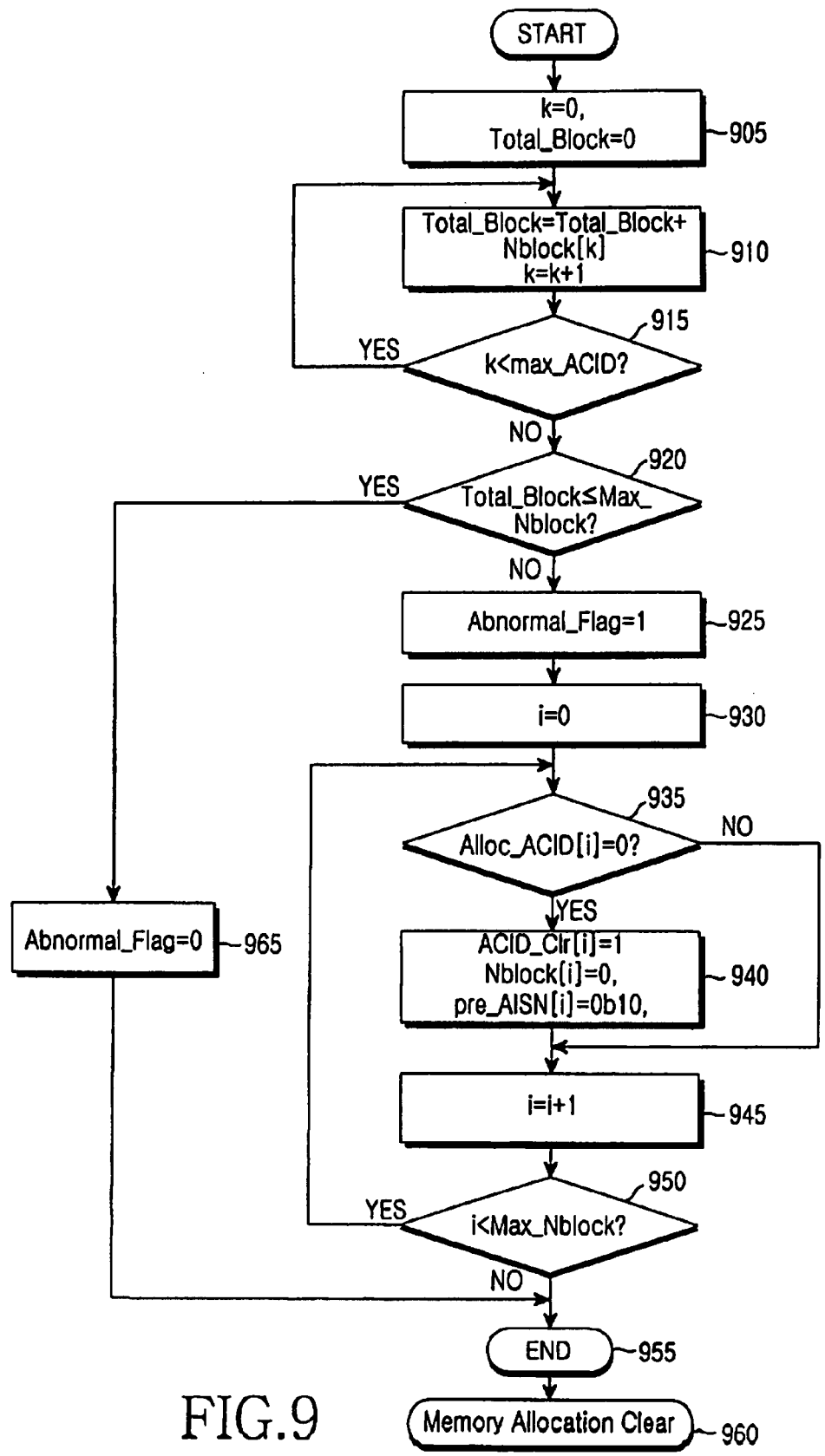
FIG. 9 is a flowchart illustrating a procedure of setting a memory region after an abnormal case has been checked according to an exemplary embodiment of the present invention.

FIG. 9 is a flowchart illustrating a procedure of determining if an abnormal case causing an overflow of the HARQ buffer occurs based on the ACID_Clr representing if memory allocation has been re-established and the Nblock value representing the size (e.g. the number of blocks) of an allocated memory according to each ACID, and additionally updating the ACID_Clr and Nblock values based on a result of the determination according to an exemplary embodiment of the present invention.

In step 905, the HARQ controller enters an initialization state. In this case, a "k" in ACID #k is set to "0," and a Total_Nblock value representing the entire allocated HARQ buffer size is set to "0." That is, with respect to ACID #k, it is set that k=0, and Total_Nblock=0."

In step 910, the value of a k increases by one (i.e. k=k+1), and the number of blocks allocated to ACID #k+1 is identified. Then, the Nblocks allocated to channels increasing from ACID #k in the way of k=k+1 are sequentially accumulated. Such an operation is repeated as many as the number of the maximum number of channels which can be allocated for the k value, as shown in step 915.

When it is determined in step 915 that the value of k in ACID #k is equal to the maximum number of channels, the HARQ controller in step 920 checks a Total_Nblock, which is the total sum of Nblock allocated to every ACID #k up to the maximum number of channels, and checks if the Total_Nblock has a value less than the maximum Nblock. When it is determined in step 920 that the Total_Nblock has a value less than the maximum Nblock, the HARQ controller in step 965 sets a flag to represent that HARQ bursts have been normally allocated. For example, an abnormal flag may be set to "0."

In contrast, when it is determined in step 920 that the Total_Nblock has a value greater than the maximum Nblock, the HARQ controller in step 925 sets a flag to represent that HARQ bursts have been abnormally allocated. For example, an abnormal flag may be set to "1."

In step 930, the HARQ controller enters an initialization state. That is, the HARQ controller in step 935 checks if the allocation Alloc_ACID for ACID #i of the current frame has been set to "0.". Thereafter, in step 940, the HARQ controller sets the memory region reset ACID_Clr for ACID #i to "1," sets the Nblock for ACID #i to "0," and initializes a pre_AI_SN value for ACID #i in the retransmission checker.

In step 945, the HARQ controller increases the value of "i" in ACID #i by one, and checks ACID #i+1, so as to perform an initialization operation. When the HARQ controller identifies ACID #i as corresponding to the maximum number of channels (ACIDs) supported by the HARQ scheme in step 950, the HARQ controller proceeds to step 955, thereby ending the procedure. In step 960, the HARQ controller resets memory regions allocated according to each ACID, based on memory region reallocation information according to each ACID.

Figure 10:
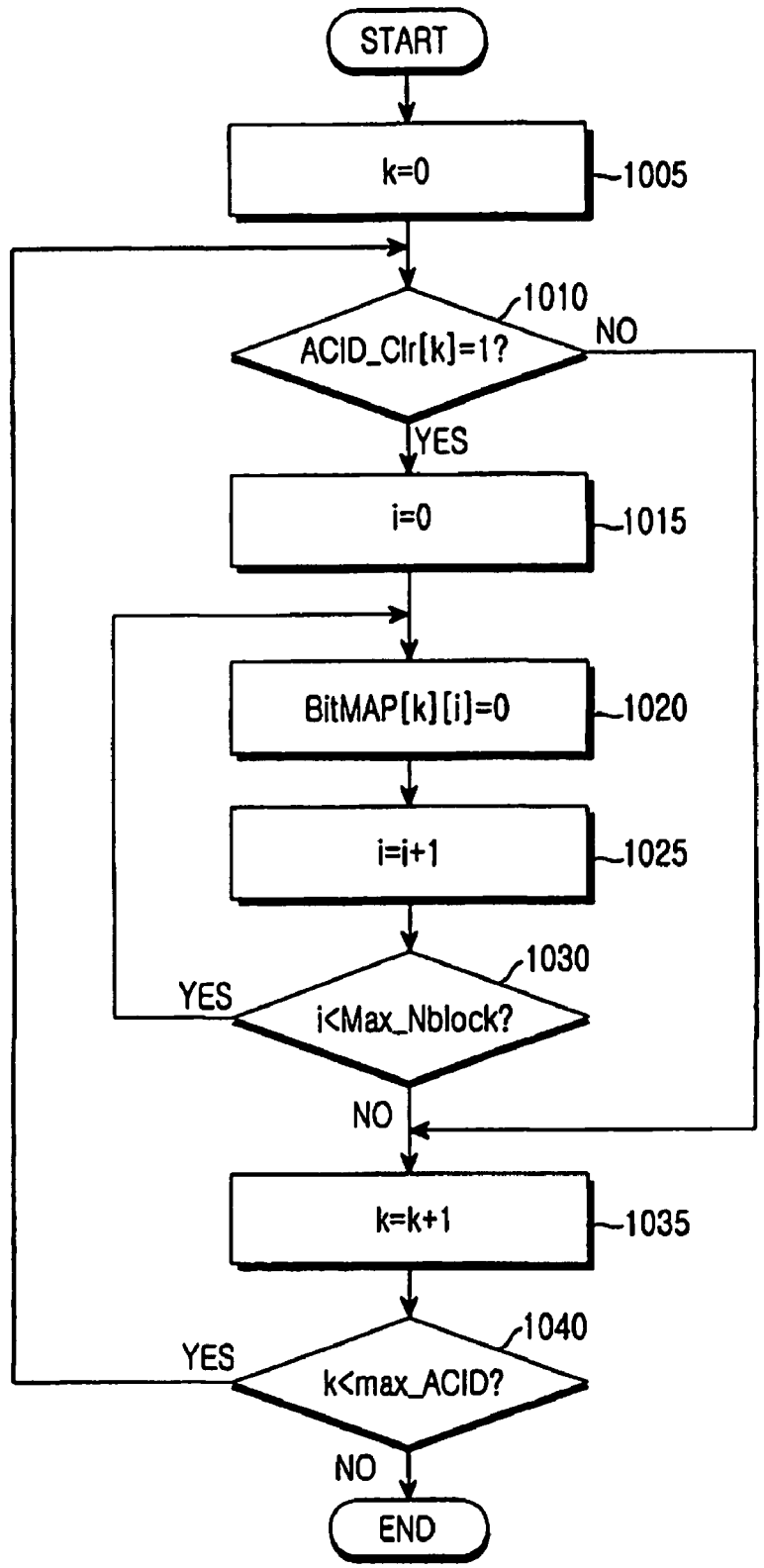
FIG. 10 is a flowchart illustrating a procedure of releasing a memory block bitmap for each ACID according to an exemplary embodiment of the present invention.

FIG. 10 is a flowchart illustrating a procedure of releasing a memory block bitmap according to each ACID, based on set ACID_Clr values, according to an exemplary embodiment of the present invention.

In step 1005, the HARQ controller identifies an ACID. In this case, the HARQ controller identifies a "k" value allocated for the ACID. The ACID represents identification information allocated for identifying HARQ channels, and may have a total of 16 pieces of identification information from #0 to #15 according to an exemplary embodiment of the present invention. In step 1010, the HARQ controller determines if the flag of a $k^{th}$ ACID_Clr has a value of ON (1). In steps 1015 to 1030, the HARQ controller clears a memory block bitmap from the first memory block (i=0) of the $k^{th}$ ACID to the last memory block (i=Max_Nblock−1). That is, the HARQ controller identifies the first memory block "i=0" for the $k^{th}$ ACID in step 1015, and clears a corresponding bitmap to "0" in step 1020. In step 1025, the HARQ controller increases the value of "i" in memory block #i by one, checks the memory block #i+1, and clears a corresponding bitmap to "0." Such an operation is repeated until the value of "i" reaches the maximum Nblock as determined in step 1030.

In step 1035, the HARQ controller sets k=k+1 and proceeds to step 1040. When it is determined in step 1040 that the value of k is less than the maximum number of allocatable channels, the HARQ controller repeats steps 1010 to 1030.

As described above, the HARQ controller releases allocation information of memory blocks according to each ACID by using the memory block bitmap, based on the ACID_Clr flag representing if memory reallocation has been performed according to each ACID.

Figure 11:
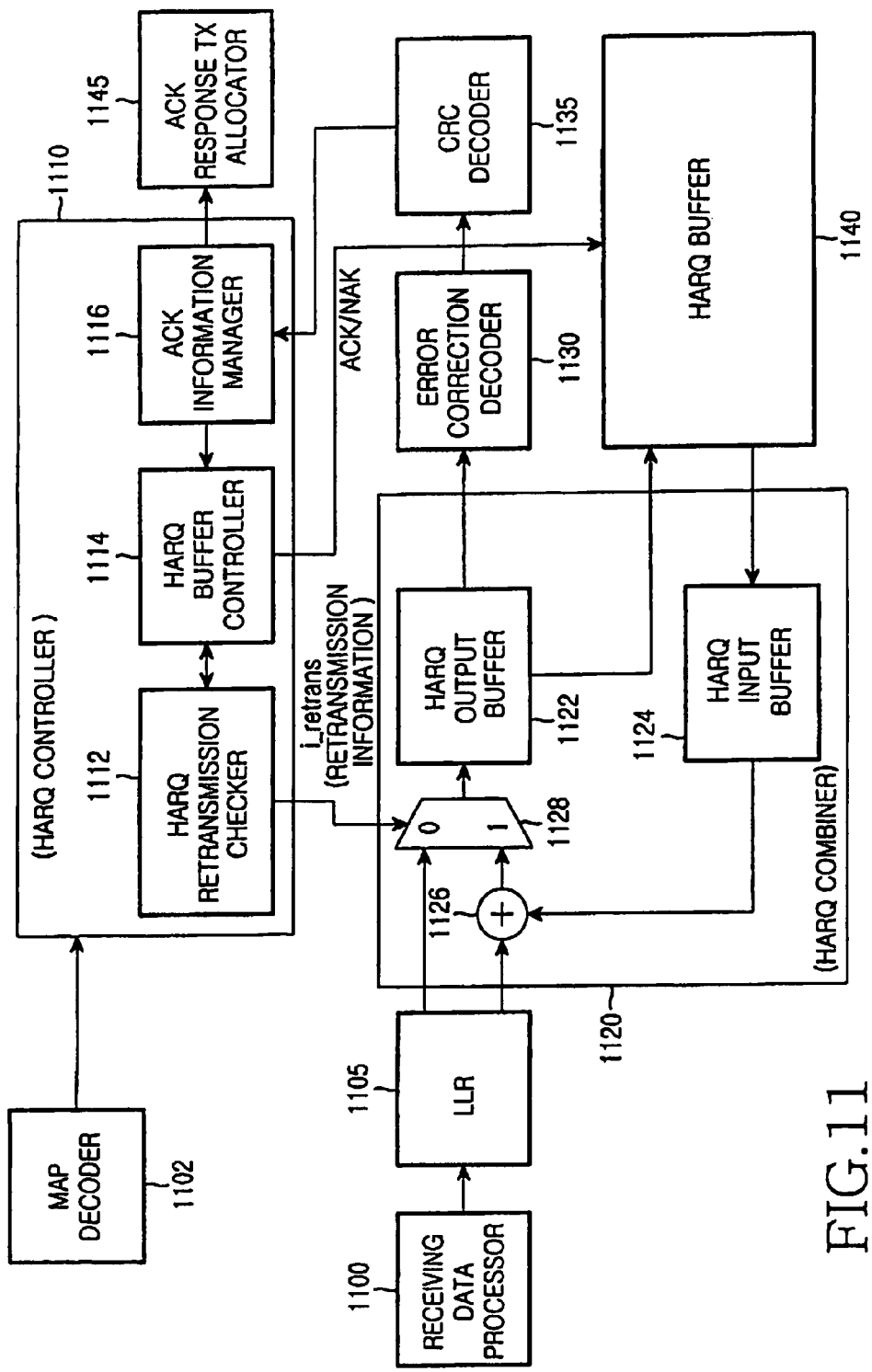
FIG. 11 is a block diagram of a receiving apparatus including an HARQ controller according to an exemplary embodiment of the present invention.

FIG. 11 is a block diagram illustrating the configuration of a receiving apparatus including the HARQ controller according to an exemplary embodiment of the present invention.

A receiving data processor 1100 performs an analog-to-digital converting operation with respect to data received through an antenna, removes a cyclic prefix from the converted digital data, performs a serial-to-parallel converting operation with respect to data including actual information, and outputs the parallel data. Thereafter, the receiving data processor 1100 performs a Fast Fourier Transform (FFT), and performs a channel estimation, thereby generating Log-Likelihood Ratio (LLR) data through demapping.

An LLR buffer 1105 temporarily stores the LLR data before transmitting the LLR data to an HARQ combiner 1120.

An HARQ controller 1110 performs a retransmission determination according to each ACID with respect to HARQ bursts, ACK information management, and a control for an HARQ buffer. An HARQ retransmission checker 1112 determines if an allocated burst corresponds to a newly transmitted burst or a retransmitted burst, and transfers retransmission information (i_retrans) to the HARQ combiner. Also, the HARQ retransmission checker 1112 transfers allocation information according to each ACID, as well as information regarding if a retransmission has been performed to an HARQ buffer controller 1114. An ACK information manager 1116 receives ACK/NAK information from a CRC decoder 1135 and manages the received ACK/NAK information according to each ACID. The HARQ buffer controller 1114 receives allocation information according to each ACID, retransmission information, ACK information, etc. from the HARQ retransmission checker 1112 and the ACK information manager 1116, determines if the allocation is available by calculating the size of an HARQ buffer required from the burst allocation information, and performs a dynamic memory allocation or a release operation according to each ACID.

The HARQ combiner 1120 combines LLR data with an HARQ burst, and buffers the combined data. The HARQ combiner 1120 receives information indicating if a retransmission of a corresponding ACID has been made, from the HARQ retransmission checker 1112. Then, in the case of a new transmission, the HARQ combiner 1120 directly transfers input LLR data without a combining operation for the LLR data, but in the case of retransmission, the HARQ combiner 120 performs a combining operation with respect to LLR data. In this case, when an HARQ burst corresponds to a retransmitted burst, the HARQ combiner 1120 fetches previous LLR data from the HARQ buffer, and temporarily stores the previous LLR data in an HARQ Input Buffer (In_Buffer) 1124. The combined data is temporarily stored in an HARQ Output Buffer (Out_Buffer) 1122, and then is stored in the HARQ buffer and is transferred to an error correction decoder 1130.

The HARQ buffer 1140 stores LLR data of HARQ bursts according to each ACID. The error correction decoder 1130 decodes received bursts. The CRC decoder 1135 performs an error detection (CRC) decoding operation with respect to the decoded bursts, thereby determining an ACK or NAK. A MAP decoder 1102 analyzes allocation information about received bursts, and transmits the analyzed allocation information to the HARQ controller 1110. An ACK response transmitting terminal (Tx allocator) 1145 transmits an ACK response for an HARQ burst.

Effects of the present invention, especially the effects obtained by the above-mentioned embodiments, will now be described.

The present invention can efficiently manage an HARQ buffer through dynamic memory control. As compared with the conventional buffer managing method, the buffer managing method according to the present invention can reduce the size of a memory for the HARQ buffer, and can more efficiently control the HARQ buffer even when an abnormal case occurs due to an ACK channel error and the like, in allocating the HARQ burst. Particularly, when a large amount of memory is required while a set of HARQ buffers is supported, such as categories 1 to 4 for Mobile WiMAX HARQ parameters, the managing method of the present invention can efficiently use a limited memory area. Accordingly, the present invention has the effects of reducing the size of the entire chip, as well as reducing power consumption.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for dynamically allocating a Hybrid Automatic Repeat Request (HARQ) buffer, which stores received HARQ bursts, to HARQ channels in a wireless communication system, the method comprising the steps of:

determining, according to each HARQ channel, if an HARQ burst has been allocated to a current frame, if the HARQ burst corresponds to a retransmitted burst, and an ACKnowledgement/Non-AcKnowledgement (ACK/NAK) according to a success/failure of decoding of an allocated HARQ burst, thereby determining whether to allocate or release an HARQ buffer region; and allocating the released buffer region to be used for a burst of another HARQ channel.

2. The method as claimed in claim 1, further comprising assigning an identification number to each HARQ channel, and generating, for each identification number, flags which indicate if an HARQ burst has been allocated, if an HARQ burst corresponds to a retransmitted burst, a result of an ACK/NAK determination, and if an HARQ burst is allocated or released.

3. The method as claimed in claim 1, wherein the step of determining whether an HARQ buffer region is allocated or released comprises:

when a newly transmitted HARQ burst has been allocated to the current frame, allocating a corresponding channel by calculating a size of a buffer region;

when a newly transmitted HARQ burst has not been allocated to the current frame, and a result of decoding a previously transmitted HARQ burst corresponds to an ACK, releasing an HARQ buffer region of a corresponding channel; and when a newly transmitted HARQ burst has not been allocated to the current frame, and a result of decoding a previously transmitted HARQ burst corresponds to an NAK, maintaining a buffer region of a corresponding channel at a previously stored value.

4. The method as claimed in claim 3, wherein, in the step of calculating the size of the buffer region, when a memory for an HARQ buffer is divided in units of predetermined sizes so as to be managed based on memory blocks, a memory value for an HARQ burst allocated for a new transmission in the current frame is calculated by $$N\text{block}=ceil(\text{Duration/Repetition}\times 48\times \text{constellationSize}\times 4\text{LLRbits}/M),$$

where the constellation size represents a bit size of a constellation according to a modulation and coding scheme (MCS), and the Log-Likelihood Ration (LLR) bits correspond to a value representing a bit resolution of an LLR value.

5. The method as claimed in claim 3, wherein, in the step of calculating a memory size, when a memory size of an HARQ buffer according to each channel is managed in units of bits, the memory size is calculate by $$N\text{block}=\text{Duration/Repetition}\times 48\times \text{constellationSize}\times 4\text{LLRbits}.$$

6. The method as claimed in claim 1, further comprising:

determining if a total sum of HARQ buffer regions reallocated according to each channel exceeds an entire HARQ buffer capacity; and releasing HARQ buffer regions for channels other than channels allocated to the current frame, when the total sum of HARQ buffer regions exceeds the entire HARQ buffer capacity.

7. An apparatus for dynamically allocating a Hybrid Automatic Repeat Request (HARQ) buffer, which stores received HARQ bursts, to HARQ channels in a wireless communication system, the apparatus comprising:

a retransmission checker for managing, according to each HARQ channel, information indicating if an HARQ burst has been allocated to a current frame, information if the HARQ burst corresponds to a retransmitted burst, and ACKnowledgement/Non-AcKnowledgement (ACK/NAK) information according to a success/failure of decoding of an allocated HARQ burst;

a buffer controller for managing information representing allocation/release of the identification information according to the allocation information and retransmission/non-retransmission for each HARQ channel, and information about a size of an HARQ buffer region allocated corresponding to the HARQ burst according to each channel; and an HARQ buffer for releasing or maintaining the buffer regions according to a control of the buffer controller.

8. The apparatus as claimed in claim 7, wherein the buffer controller divides the HARQ buffer into N number of memory blocks, assign an identification number to each memory block, and sets and manages a memory block bitmap which represents if a specific memory block is allocated according to each HARQ channel.

9. The apparatus as claimed in claim 7, wherein the buffer controller assigns an identification number to each HARQ channel, and generates and manages flags indicating the information.

10. The apparatus as claimed in claim 7, wherein the buffer controller:

calculates a size of a buffer region to be allocated to a corresponding channel when a newly transmitted HARQ burst has been allocated to the current frame;

releases an HARQ buffer region of a corresponding channel when a newly transmitted HARQ burst has not been allocated to the current frame, and a result of decoding a previously transmitted HARQ burst corresponds to an ACK; and maintains a buffer region of a corresponding channel at a previously stored value when a newly transmitted HARQ burst has not been allocated to the current frame, and a result of decoding a previously transmitted HARQ burst corresponds to a NAK.

11. The apparatus as claimed in claim 10, wherein when a memory for an HARQ buffer is divided in units of predetermined sizes so as to be managed based on memory blocks, the buffer controller calculates a memory value for an HARQ burst allocated for a new transmission in the current frame by $$N\text{block} = ceil(\text{Duration}/\text{Repetition} \times 48 \times \text{constellationSize} \times 4\text{LLRbits}/M),$$

where the constellation size represents a bit size of a constellation according to a modulation and coding scheme (MCS), and the Log-Likelihood Ration (LLR) bits correspond to a value representing a bit resolution of an LLR value.

12. The apparatus as claimed in claim 10, wherein when a memory size of an HARQ buffer according to each channel is managed in units of bits, the buffer controller calculates the memory size by $$N\text{block} = \text{Duration}/\text{Repetition} \times 48 \times \text{constellationSize} \times 4\text{LLRbits}.$$

13. The apparatus as claimed in claim 7, wherein when a total sum of HARQ buffer regions reallocated according to each channel exceeds an entire HARQ buffer capacity, the buffer controller releases HARQ buffer regions for channels other than channels allocated to the current frame.

* * * * *